United States Patent [19]

Weissbrich et al.

[11] Patent Number: 5,259,814
[45] Date of Patent: Nov. 9, 1993

[54] PROCESS FOR VENTILATING THE INTERIOR OF A MOTOR VEHICLE AND VENTILATION SYSTEM FOR THE PERFORMANCE THEREOF

[75] Inventors: Alfons Weissbrich, Gauting; Ferdinand Hahn, Ebenhausen, both of Fed. Rep. of Germany

[73] Assignee: Webasto Karosseriesysteme GmbH, Stockdorf, Fed. Rep. of Germany

[21] Appl. No.: 943,533

[22] Filed: Sep. 11, 1992

[30] Foreign Application Priority Data

Sep. 11, 1991 [DE] Fed. Rep. of Germany ....... 4130226

[51] Int. Cl.$^5$ .............................................. B60H 1/24
[52] U.S. Cl. .................... 454/75; 236/49.3; 454/900
[58] Field of Search ................. 236/49.3; 454/75, 129, 454/136, 141, 143, 900

[56] References Cited

U.S. PATENT DOCUMENTS 4,436,064  3/1984  Lamkewitz et al. ......... 123/142.5 R
4,852,469  8/1989  Chuang ................................ 454/75

FOREIGN PATENT DOCUMENTS 256313  7/1987  European Pat. Off. .
3924755  1/1991  Fed. Rep. of Germany .
3938259  6/1991  Fed. Rep. of Germany .
13216  2/1981  Japan ..................................... 454/75

Primary Examiner—Harold Joyce
Attorney, Agent, or Firm—Sixbey, Friedman, Leedom & Ferguson

[57] ABSTRACT

A process for ventilating the interior of a motor vehicle having a closure which can be opened by a drive motor, an interior temperature-setpoint value generator, at least one interior temperature sensor, at least one outside temperature sensor and a logic component with inputs, outputs and a computer portion. Existing components (sensors, logic components) of different units are used and operatively linked so that the driver is largely relieved of the need to manipulate numerous controls.

37 Claims, 3 Drawing Sheets

PROCESS FOR VENTILATING THE INTERIOR OF A MOTOR VEHICLE AND VENTILATION SYSTEM FOR THE PERFORMANCE THEREOF

BACKGROUND OF THE INVENTION

The invention relates to a process for ventilating the interior of a motor vehicle having at least one closure, such as a roof cover or windows, which can be opened by a drive motor operated in response to outputs from a logic component or control device which includes a computer for receiving inputs from an interior temperature-setpoint value generator, at least one interior temperature sensor and at least one outside temperature sensor.

The present invention can be incorporated in all motor vehicles of the luxury class which are equipped with electric window lift mechanisms and/or an electric sliding-lifting roof and an on-board computer as well as an air conditioner.

In addition to electrically operated windows and sliding-lifting roofs, various motor vehicle auxiliary ventilation systems are well known in the art. For example, European Patent No. 256,313 and German Patent No. 3,938,259 both disclose ventilation systems which are preferably operated by solar power and include a ventilator or fan and an operating device for a roof cover.

Since the individual components are usually obtained from various suppliers, each component has its own control panel, switching logic and sensors. This compilation of components creates an undesired accumulation of parts, which causes an increase in the total price and weight of the motor vehicle. Also, the driver may become stressed and distracted by the plurality of necessary switching operations, especially since the interaction of the various components is often difficult to figure out.

SUMMARY OF THE INVENTION

The object of the present invention is to provide a process for ventilating the interior of a motor vehicle which effectively uses individual operating components (sensors, switching logic) in such a manner to provide a variety of ventilation conditions thereby relieving the driver, as much as possible, of the manipulation of controls. The process according to the invention is suitable both for auxiliary ventilation and for air conditioning in driving operation.

This object of the present invention is achieved by a ventilating process which includes reading both an interior temperature-setpoint value and an interior temperature-setpoint value range, and measuring both the motor vehicles' interior temperature and the outside temperature. These four values are supplied to the input of a logic component having a computer portion which calculates an upper and a lower threshold temperature. An output signal from the logic component then controls the drive motor associated with one or more of the vehicle closures (e.g., roof cover, windows, etc.) to move the closure in the opening direction if: the interior temperature is no greater than the outside temperature and the interior temperature is greater than the upper threshold temperature, or if the interior temperature is less than or equal to the outside temperature and the interior temperature is less than the lower threshold temperature. The vehicle closure will be moved in the closed direction if the interior temperature is greater than the outside temperature and less than or equal to upper threshold temperature and less than the lower threshold temperature. The process may also operate to turn on the vehicle's air conditioner if the interior temperature is greater than both the outside temperature and the upper threshold temperature.

The interior temperature-setpoint value can be adjusted manually on an interior temperature-setpoint generator so that each driver can set a temperature which is comfortable for himself. Also, a manual setting of the interior temperature setpoint value range may be provided to allow the driver, based on his experience in driving the motor vehicle, to preset the setpoint value range permitting the driver to have greater control over the opening and closing of the various vehicle closures (windows, sliding-lifting roof).

Values for the atmospheric moisture and/or motor vehicle speed can be supplied to the logic component as additional parameters to be used in calculating the interior temperature-setpoint value and the interior temperature-setpoint value range. Therefore, yet additional values essential for comfort may be considered in addition to the consideration of the outside and inside temperature.

In addition, the upper threshold value and lower threshold value may be calculated taking into consideration other parameters, such as outside temperature, atmospheric moisture, motor vehicle speed, or other performance data read from a memory connected with the logic component.

The process may also include a comfort switch to be operated by the driver which is examined before all other process steps to see whether it is in the ON position. In this manner, the driver can manually override the automatic operation of the ventilation system.

To enhance the ventilation action, the process may include operating at least one ventilator or fan placed in the motor vehicle, simultaneous with the operation of the roof cover and windows. Specifically, it is especially advantageous to activate the fan to convey air from the outside into the interior when the interior temperature is less than or equal to the outside temperature and the interior temperature is less than the lower threshold temperature. The fan is preferably placed in the area of a ventilation gap that is exposed by the cover or window being operated. The fan is also preferably operated by solar power which may be generated by a solar roof cover. However, the fan or fans may be powered by the motor vehicle battery, in which case under-voltage protection should be provided.

The interior temperature of the motor vehicle, as experienced by the occupant, may be more accurately determined by using two interior temperature sensors (e.g., in the head area and on the dashboard). A weighted average value can then be calculated using both measured values indicated by the sensors. Likewise, two outside temperature sensors may be used to produced an average weighted value. As a result, more reliable conclusions can be drawn from the outside temperature.

One of the inputs of the logic component may be connected to a rain sensor for detecting precipitation. If precipitation is detected, the logic component gives off an output signal causing at least partial closing of the vehicle closure.

These and further objects, features and advantages of the present invention will become apparent from the following description and the accompanying drawings which, for purposes of illustration only, show several embodiments in accordance with the present invention.

DETAILED DESCRIPTION OF THE PREFERRED EMBODIMENT

Figure 1:
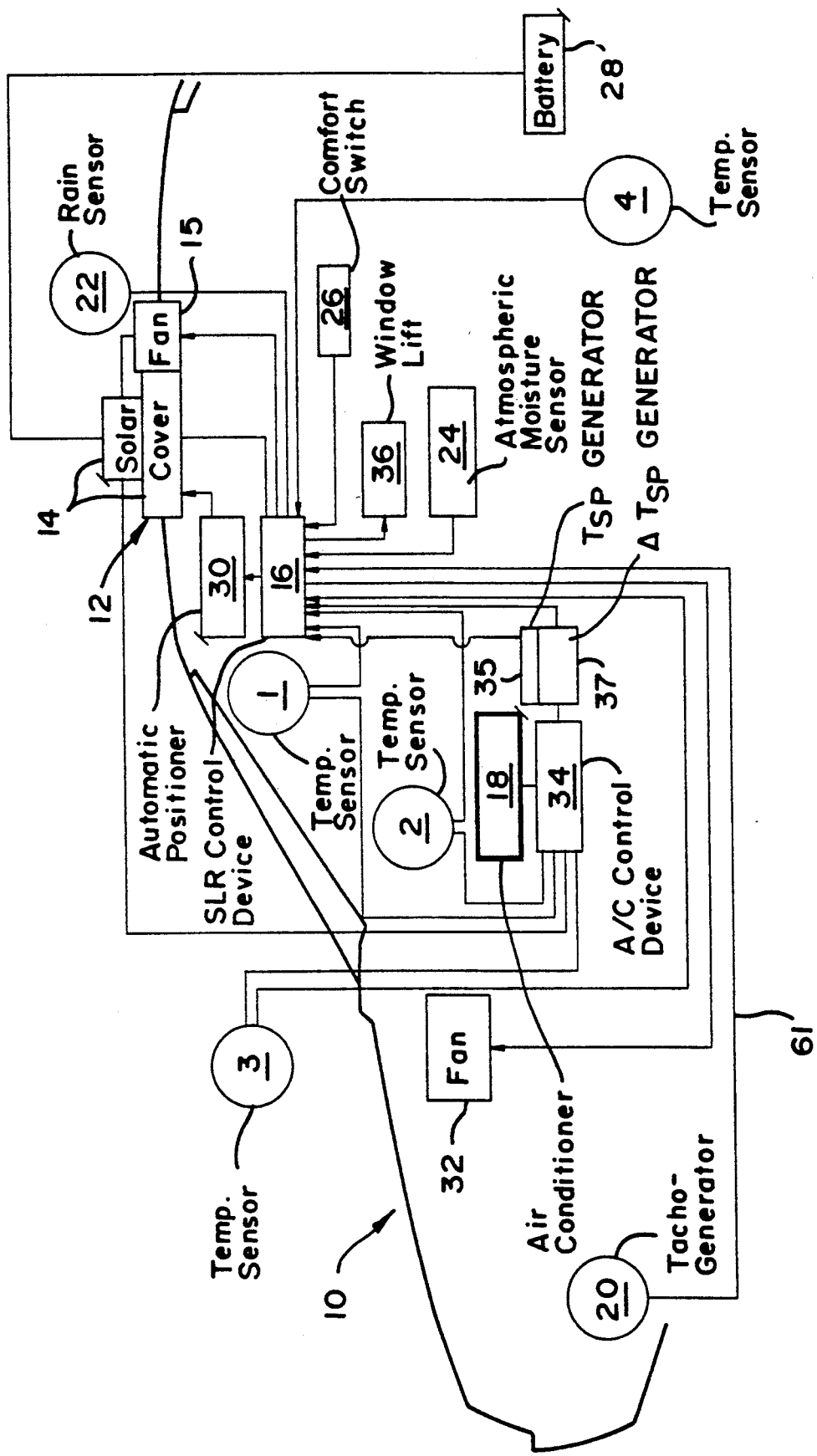
FIG. 1 is a diagrammatic arrangement of the individual components of the ventilation process embodying the present invention as applied to a motor vehicle.

Referring to FIG. 1, the individual components used to effectuate the ventilation process are diagrammatically represented in relation to a motor vehicle indicated generally at 10. The motor vehicle includes an electric sliding-lifting roof 12 with a solar cover 14 and a first ventilator or fan 15 placed in the vicinity of the ventilation gap that is formed by opening cover 14. The electric sliding-lifting roof (SLR) 12 is operated by a logic component or SLR control device 16 which has several inputs and outputs at its disposal. The inputs include an interior temperature sensor 1 positioned in the driver's head area of the vehicle, an interior temperature sensor 2 located in the area of the dashboard assigned to an air conditioner 18 of the motor vehicle, an outside temperature sensor 3 placed in the area of the air supply shaft in front of the windshield, an outside temperature sensor 4 placed in the area of the front bumper, a tachogenerator 20, a rain sensor 22 preferably placed in the vicinity of the rear window, an atmospheric moisture sensor 24 and a comfort switch 26.

The SLR 12 is preferably normally supplied by solar power produced by crystalline solar cover 14 with the motor vehicle battery 28 acting as an alternate power source in case of insufficient output. SLR control device 16 (which can be a logic circuit, microcomputer chip or an existing on-board computer component of the vehicle) controls the position of SLR 12 via an automatic positioner 30 capable of moving SLR 12 into a closed position, a push-open position and one or more sliding positions. SLR control device 16 also controls the position of any window lift mechanisms, the operation of first fan 15 as well as the motor vehicle's second fan 32 placed in the area of the dashboard.

The operation of the motor vehicle air conditioner 18 is controlled by its own separate control device 34 to which both an interior temperature-setpoint value generator 35 and an interior temperature-setpoint value range generator 37 are connected. In a more integrated variation, these generators may also be connected to the control device of the electric sliding-lifting roof to control the operation of the air conditioner by this control device. Alternatively, instead of using a separate SLR control device 16, an air conditioner control device may be used as a logic component to which all ventilation related sensors are connected and from which all ventilation related control functions originate.

If the motor vehicle is equipped with an on-board computer to which an outside temperature sensor is connected, the latter may be suitably used to determine the outside temperature. In addition, if the vehicle is equipped with an air conditioner, existing interior temperature sensors, interior temperature-setpoint value generators and outside temperature sensors are also advantageously used.

If the SLR 12 or any other closure that can be opened is equipped with an existing operating mechanism of its own, the latter is suitably used as a logic component. Also, a cover that can be placed in the roof of the motor vehicle and swung at least around an axis transverse to the lengthwise direction of the motor vehicle is especially suitable for use.

Figure 2:
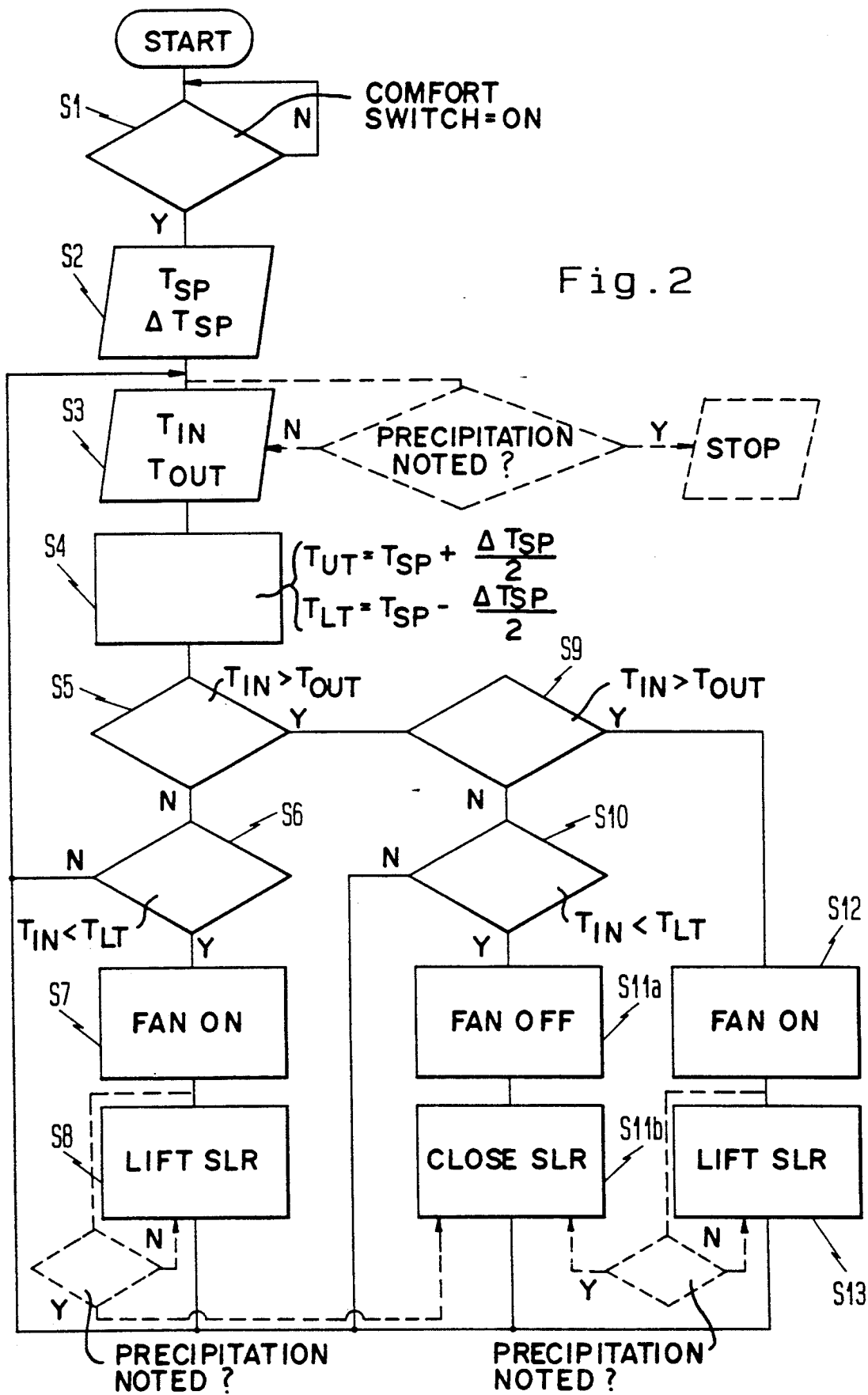
FIG. 2 is a block diagram illustrating the ventilation process steps according to the present invention.

Referring to FIG. 2, the operational sequence of a first embodiment of the ventilation process according to the present invention will now be described. Initially, in the first process step S1, which is triggered by the operation of a preselection clock (not shown) or a remote-controlled device, the position of comfort switch 26 is examined. The comfort switch is manually operated by the driver to activate or deactivate the automatic ventilation process as desired. If the comfort switch is in the On position, an interior temperature-setpoint value $T_{SP}$ and an interior temperature-setpoint value range $\Delta T_{SP}$ are read into the control device 16 in the next process step S2. Alternatively, the driver may manually input these values in corresponding setpoint value generators. In the next process step S3, an interior temperature $T_{IN}$ and an outside temperature $T_{OUT}$ are read into the logic component of SLR control device 16 directly from two corresponding sensors. However, in the preferred embodiment, interior temperature value $T_{IN}$ is calculated from two initial values (T1, T2) measured by two interior temperature sensors 1 and 2 while two outside temperature sensors 3 and 4 provide two initial outside temperature values (T3, T4) for calculating outside temperature $T_{OUT}$. Interior temperature $T_{IN}$ and outside temperature $T_{OUT}$ are each calculated from the corresponding initial temperature values using an average weighted percentage formulation as illustrated, for example, by the following formulas:

$$T_{IN} = 0.7 \times T1 + 0.3 \times T2$$

$$T_{OUT} = 0.1 \times T3 + 0.9 \times T4$$

In the following step S4, an upper threshold value temperature $T_{UT}$ is calculated according to the formula $T_{UT} = (T_{SP} + \Delta T_{SP})/2$ and a lower threshold temperature $T_{LT}$ is calculated according to the formula $T_{LT} = (T_{SP} - \Delta T_{SP})/2$. In a more complex variation not described here, outside temperature $T_{OUT}$, inside temperature $T_{IN}$ as well as an atmospheric moisture reading (obtained, e.g., from rain sensor 22) and the traveling speed of the vehicle (determined as a function of the output of the tachogenerator 20, for example) could also enter into the calculation of upper threshold temperature $T_{UT}$ and lower threshold temperature $T_{LT}$.

In the next process step S5, measured or calculated interior temperature $T_{IN}$ is compared to outside temperature $T_{OUT}$. If interior temperature $T_{IN}$ is not greater than outside temperature $T_{OUT}$ then, in the next process step S6, it is determined whether $T_{IN}$ is smaller than $T_{LT}$. If this condition is not met, the sequence or path of operation leads back to process step S3. If the condition in process step S6 is met, one or both of the fans 15, 32 are turned on in the following process step S7 and SLR 12 is placed in lifting position in the process step S8. Subsequently, the sequence of operation leads back to process step S3.

If the condition $T_{IN} > T_{OUT}$, examined in process step S5, is answered in the affirmative, an examination of condition $T_{IN} > T_{UT}$ follows in the next process step S9. If the condition in process step S9 is not met, the inquiry follows in the process step S10 whether $T_{IN} < T_{LT}$. If this condition is also not satisfied, the sequence of operation leads back to step S3. If the condition in step S10 is satisfied, the fan is turned off and SLR 12 is closed in the subsequent steps S11a and S11b, respectively. The sequence of operation then leads back to step S3. If condition $T_{IN} > T_{UT}$ in step S9 is met, one or both of fans 15 and 32 are turned on in the next process step S12 and the sliding-lifting roof 12 is lifted in the following process step S13. The operational sequence then again leads back to process step S3.

The turning on of the fan in step S7 as well as the lifting of the SLR in step S8, when interior temperature $T_{IN}$ is both less than or equal to outside temperature $T_{OUT}$ and less than lower threshold temperature $T_{LT}$, is used to convey the relatively warmer outside air into the cooler interior of the vehicle. Conversely, the operation of the fan and the opening of SLR 12 in process steps S12 and S13 serve the purpose of removing heated air from the interior of the vehicle when interior temperature $T_{IN}$ is greater than both outside temperature $T_{OUT}$ and upper threshold temperature $T_{UT}$.

The turning off of the fan or fans 15, 32 in process step S11a and the closing of SLR 12 in process step S11b serve the purpose of preserving the status quo when inside temperature $T_{IN}$ is greater than outside temperature $T_{OUT}$, less than upper threshold temperature $T_{UT}$ and less than lower threshold temperature $T_{LT}$. The ventilation process could also include a step for turning on a fan if interior temperature $T_{IN}$ fell significantly below the lower threshold temperature $T_{LT}$ in step S11b and a motor-independent heater was available.

Figure 3:
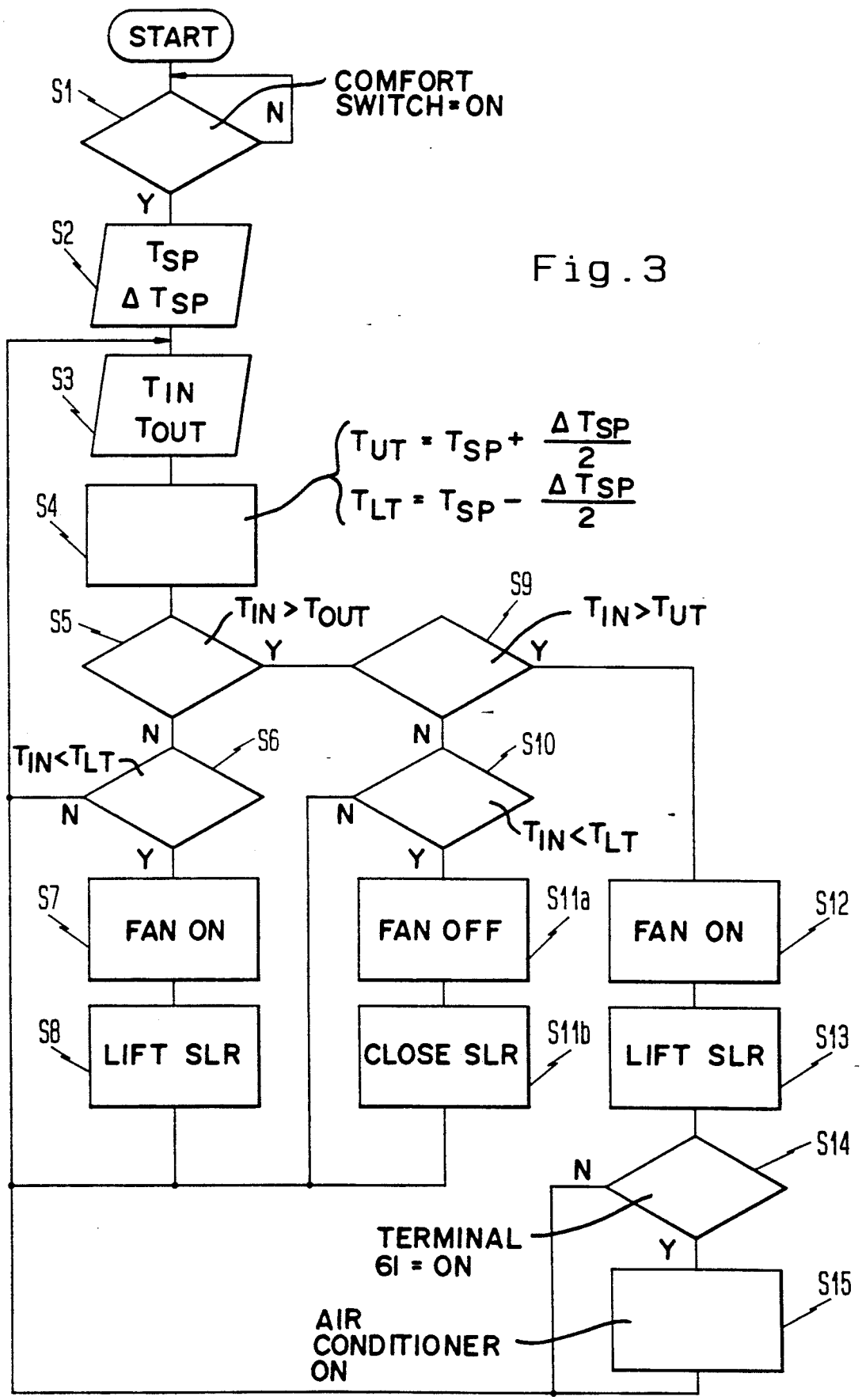
FIG. 3 is a block diagram illustrating the ventilation process steps of a second embodiment of the present invention incorporating an air conditioner.

In the second embodiment represented in FIG. 3, process steps S1 to S13 are identical to the above-described preferred embodiment shown in FIG. 2. However, if the motor vehicle has an air conditioner, the process may use the air conditioner to improve the quality of ventilation by incorporating the process steps S14 and S15 following step S13. While the process described in FIG. 2 also operates in a turned-off motor vehicle, the operation of the air conditioner is possible only when the motor vehicle is in operation because of the increased energy consumption of the compressor. The inquiry in process step S14 is whether the motor vehicle engine is operating. If engine operation is detected (such as by the presence or absence of a signal 61 from tachogenerator 20), terminal 61 of process step S14 shows a positive signal. If the result of the inquiry in step S14 is positive, the air conditioner is turned on in a step S15. Also, from step S15, the sequence of operation leads back to step S3. The turning off of the air conditioner is not represented and takes place automatically depending on temperature (e.g., following step S11b). If the result of the inquiry in step S14 is negative, the sequence of operation leads back without action to step S3.

Although process steps S8, S11b and S13 have been described as only operating the sliding-lifting roof 12, one or more electric window lift mechanisms 36 may be activated to at least partially open or close one or more of the motor vehicle windows simultaneously with these process steps.

Referring to FIGS. 1-3, one of the inputs of the logic component may be connected to a rain sensor for detecting precipitation. If precipitation is detected, the logic component gives off an output signal causing at least partial closing of the vehicle closure. The signal which leads from rain sensor 22 represented in FIG. 1 to control device 16 may be incorporated into the operational sequence in either of two places. As shown in FIG. 2, it may tie in before process step S3 as an additional inquiry, with the result that, if precipitation is noted, stopping of the process occurs. Alternatively, the question of precipitation can be asked before each operation of SLR 12 in the opening direction in steps S8 and S13. In this case, a positive answer results in bypassing step S8 or S13 thereby preventing SLR 12 or the windows from opening.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A process for ventilating the interior of a motor vehicle having at least one openable closure operated by a drive motor, an interior temperature-setpoint value generator, at least one interior temperature sensor, at least one outside temperature sensor and a logic component having inputs, outputs and a computer portion, said process comprising the steps of:
   a. reading into the logic component an interior temperature-setpoint value;
   b. reading into the logic component an interior temperature-setpoint value range;
   c. measuring an interior temperature of the motor vehicle to obtain an interior temperature value;
   d. measuring an outside temperature to obtain an outside temperature value;
   e. calculating an upper threshold temperature value and a lower threshold temperature value in the computer portion from said interior temperature-setpoint value and said interior temperature-setpoint value range supplied to the inputs of the logic component;
   f. controlling the drive motor from an output of the logic component to operate the closure in an opening direction when either of the following condition is determined to exist (i) if said interior temperature value is greater than said outside temperature value and said interior temperature value is greater than said upper threshold temperature value, or (ii) if said interior temperature value is less than or equal to said outside temperature value and said interior temperature value is less than said lower threshold temperature value
   g. controlling the drive motor from an output of the logic component to operate the closure in a closed direction when said interior temperature value is greater than said outside temperature value and less than or equal to said upper threshold temperature value and less than said lower threshold temperature value.

2. The process according to claim 1, wherein said interior temperature-setpoint value is adjusted manually using the interior temperature-setpoint value generator.

3. The process according to claim 1, wherein said interior temperature-setpoint value range is adjusted manually using a setpoint value range generator.

4. The process according to claim 1, further including the step of feeding to the logic component a value for atmospheric moisture.

5. The process according to claim 4, wherein said interior temperature set point value is calculated as a function of at least one of said outside temperature value, said atmospheric moisture value and a motor vehicle speed value.

6. The process according to claim 4, wherein said interior temperature-setpoint value range is calculated as a function of at least one of said outside temperature value, said interior temperature value and said atmospheric moisture value.

7. The process according to claim 1, wherein said upper threshold temperature value is determined by adding half of said interior temperature-setpoint value range to said interior temperature-setpoint value.

8. The process according to claim 7, wherein said lower threshold temperature value is determined by subtracting half of said interior temperature-setpoint value range from said interior temperature-setpoint value.

9. The process according to claim 1, further including the step of determining whether a comfort switch operated by the driver is in an ON position.

10. The process according to claim 1, wherein the outside temperature is measured by an existing temperature sensor of a motor vehicle on-board computer and by an outside temperature sensor connected to the motor vehicle on-board computer.

11. The process according to claim 1, wherein the interior temperature is measured by an interior temperature sensor connected to a control device of an on-board air conditioner.

12. The process according in claim 1, wherein said logic component is an existing on-board control device for the closure.

13. The process according to claim 1, wherein the closure is formed in a roof of the motor vehicle.

14. The process according to claim 13, wherein the closure can be swiveled at least around an axis transverse to a motor vehicle lengthwise direction.

15. The process according to claim 1, wherein at least one fan positioned in the motor vehicle is operated simultaneously with the operation of the closure.

16. The process according to claim 15, wherein said at least one fan conveys air from outside to the interior of the motor vehicle when said interior temperature value is less than or equal to said outside temperature value and said interior temperature value is less than said lower threshold value.

17. The process according to claim 15, wherein said at least one fan is positioned in the area of a ventilation gap formed by the closure.

18. The process according to claim 17, wherein said at least one fan is operated by solar power.

19. The process according to claim 17, wherein said at least one fan is operated by a motor vehicle battery.

20. The process according to claim 19, wherein said at least one fan is turned off if a voltage of said battery falls below a preset value.

21. The process according to claim 1, wherein two interior temperature sensors are used to generate initial interior temperature values and said interior temperature value is determined by an averaging of the initial interior temperature values weighted by percentage factors.

22. The process according to claim 1, wherein two outside temperature sensors are used to generate initial outside temperature values and said outside temperature value is determined by an averaging of the initial outside temperature values weighted by percentage factors.

23. The process according to claim 1, wherein the logic component is connected by an input to a rain sensor which gives off an output signal for at least partial closing of the closure upon detecting precipitation.

24. The process according to claim 1, wherein a motor vehicle air conditioner is turned on if the motor vehicle engine is operating and said interior temperature value is greater than said outside temperature value and said interior temperature value is greater than said upper threshold temperature value.

25. A ventilation system for a motor vehicle having at least one openable closure operated by a drive motor, comprising:
   a logic component having inputs, outputs and a computer portion, said computer portion connected to said input and said outputs;
   an interior temperature-setpoint value generator connected to said logic component for reading into said logic component an interior temperature-setpoint value;
   an interior temperature-setpoint value range generator connected to said logic component for reading into said logic component an interior temperature-setpoint value range;
   at least one interior temperature sensor connected to said logic component for measuring an interior temperature value.
   at least one outside temperature sensor connected to said logic component for measuring an outside temperature value, said logic component capable of calculating an upper threshold temperature value and a lower threshold temperature value in the computer portion from said interior temperature-setpoint value and said interior temperature-setpoint value range supplied to the inputs of the logic component; wherein said logic component controls the drive motor from an output of the logic component to operate the closure in an opening direction when either of the following condition is determined to exist (i) if said interior temperature value is greater than said outside temperature value and said interior temperature value is greater than said upper threshold temperature value, or (ii) if said interior temperature value is less than or equal to said outside temperature value and said interior temperature value is less than said lower threshold temperature value
   controlling the drive motor from and output of the logic component to operate the closure in a closed direction when said interior temperature value is greater than said outside temperature value and less than or equal to said upper threshold temperature value and less than said lower threshold temperature value.

26. The ventilation system according to claim 25, wherein said interior temperature-setpoint value is adjusted manually using the interior temperature-setpoint value generator.

27. The ventilation system according to claim 25, wherein said interior temperature-setpoint value range is adjusted manually using the setpoint value range generator.

28. The ventilation system according to claim 25, wherein at least one outside temperature sensor includes an existing temperature sensor of an existing temperature sensor of a motor vehicle on-board computer and an outside temperature sensor connected to the motor vehicle on-board computer.

29. The ventilation system according to claim 25, wherein at least one interior temperature sensor is connected to a control device of an onboard air conditioner.

30. The ventilation system according to claim 25, wherein said logic component is an existing on-board control device for the closure.

31. The ventilation system according to claim 25, wherein the closure is formed in a roof of the motor vehicle.

32. The ventilation system according to claim 31, wherein the closure can be swiveled at least around an axis transverse to a motor vehicle lengthwise direction.

33. The ventilation system according to claim 25, further including at least one fan positioned in the motor vehicle and operated simultaneously with the operation of the closure.

34. The ventilation system according to claim 33, wherein said at least one fan is positioned in the area of a ventilation gap formed by the closure.

35. The ventilation system according to claim 34, wherein said at least one fan is operated by solar power.

36. The ventilation system according to claim 34, wherein said at least one fan is operated by a motor vehicle battery.

37. The ventilation system according to claim 25, further including a rain sensor connected by an input to the logic component, said rain sensor capable of giving off an output signal for at least partial closing of the closure upon detecting precipitation.

* * * * *